3,306,868
DICYCLOPENTADIENE - DICARBOXYLIC ACID REACTION PRODUCTS AND POLYESTERS THEREOF
Herbert M. Adrian, Jr., St. Paul, Minn., assignor to Archer-Daniels-Midland Company, Minneapolis, Minn., a corporation of Delaware
No Drawing. Filed July 29, 1963, Ser. No. 298,448
5 Claims. (Cl. 260—23.7)

This invention relates to an improved catalyst and a new and useful method of economically copolymerizing ethylenically unsaturated organic compounds with dicyclopentadiene and the products obtained thereby. More particularly, this invention relates to polymers formed by an improved method of catalytically copolymerizing olefinic compounds with dicyclopentadiene without the use of pressure or reflux and where a portion of the catalyst is subsequently retained as a reactant, the remainder being neutralized or removed.

Dicyclopentadiene and cyclopentadiene are known to react with ethylenically unsaturated compounds such as fatty material. Several methods are known to effect this reaction. Since dicyclopentadiene does not readily react with unsaturated materials below its boiling point, the general method has been to react under pressure at elevated temperatures. It is also known that the reaction can be effected by refluxing the dicyclopentadiene at atmospheric pressure for extended periods of time. Eventually, the dicyclopentadiene will copolymerize with the unsaturated monomeric or polymeric fatty materials which are present.

The present invention discloses a method of producing dicyclopentadiene copolymers without pressure requirements and yet in reasonably short reaction times. By reason of the improvement herein, refluxing and pressure equipment is not required, thus making the present method more economical and practical with a minimum investment in equipment. The degree of polymerization can also be controlled so that a very low to very high viscosity can be obtained for relatively high dicyclopentadiene content resins.

It is therefore an object of this invention to react dicyclopentadiene with olefinic compounds without pressure requirements by use of a novel catalyst. Another object of this invention is to provide an economical and practical method of improving drying oils by reaction with dicyclopentadiene without the necessity of pressure or reflux equipment. A further object of this invention is to provide a process for improving drying vehicles which are particularly suited for paints, foundry core binders and encapsulation of small granular organic and inorganic materials.

The objects of this invention are accomplished by the process comprising providing a reaction mixture of an unsaturated compound selected from the group consisting of unsaturated fatty acids, unsaturated fatty esters, and petroleum derived olefins, dicyclopentadiene and a catalyst comprising boron trifluoride and a carboxylic acid component of 2 to 8 carbon atoms selected from the group consisting of dicarboxylic acids and their anhydrides and alpha,beta-unsaturated carboxylic acids and heating the mixture to a temperature of 130° F. to 340° F. to effect copolymerization.

This copolymerization method provides a method by which large amounts of dicyclopentadiene can be copolymerized with a fatty oil and still obtain a lower viscosity than can be obtained by pressure reaction. A further advantage in this method over other catalytic dicyclopentadiene copolymerization methods is the ease with which the catalyst can be neutralized.

The catalyst of this invention comprises a combination of boron trifluoride and said carboxylic acid component. Boron trifluoride is a gas at room temperature but is commonly complexed with an ether such as diethyl ether (e.g., boron trifluoride etherate containing 48% boron trifluoride) so as to be more conveniently handled in laboratory preparations. This invention can utilize either the boron triffuoride gas or a boron trifluoride complex which retains the boron trifluoride activity at the polymerization temperature. For production purposes, boron trifluoride gas can be conveniently used.

The amount of boron trifluoride used is in the range of 0.02% to about 0.35% based on the weight of charge.

The boron trifluoride catalyst component is preferably added to the reaction vessel prior to heating. This can be accomplished in several ways. One method would be to dilute a complexed material with a porton of the oil and subsequently add the mixture to the reaction vessel. If the boron trifluoride is used as a gas, it can be conveniently weighed into the reaction vessel by bubbling it through the oil charge which rapidly absorbs the gas.

The carboxylic acid component portion of the catalyst comprises about 1.0% to about 10% of a carboxylic acid component selected from the group consisting of dicarboxylic acids and their anhydrides, and alpha,beta-unsaturated carboxylic acids. The dicarboxylic acids which are useful in the catalyst system are those which contain 2 to about 8 carbon atoms and are either saturated or ethylenically unsaturated. These preferably include such unsubstituted acids as oxalic, malonic, succinic, glutaric, adipic, pimelic, suberic, maleic, fumaric and include the respective anhydrides. The alpha,beta-unsaturated carboxylic acids which can be used include those having 3 to about 8 carbon atoms and which are alpha,beta-ethylenically unsaturated. Included in this group are acrylic, crotonic, and the like.

The preferred carboxylic acid component is maleic acid or maleic anhydride. The amount used is in the range of 1% to 10% and more preferably within the narrower range of 2% to about 5% based on the total charge. The carboxylic acid component is added to the reaction vessel prior to heating.

The amount of carboxylic acid component required in a given reaction is primarily dependent upon the desired product. A more viscous oil is obtained using the larger percentages of carboxylic acid component. When the larger amounts of carboxylic acid component are used a lesser amount of boron trifluoride is required. These factors must be taken into account in determining the proper catalyst composition ratio. The functionality of the fatty material or olefin and the amount of dicyclopentadiene used must also be taken into account. Olefins and fatty materials having greater reactivity require lesser amounts of boron trifluoride to accomplish the copolymerization. Higher percentages of dicyclopentadiene require greater amounts of boron trifluoride than small percentages. This, however, is offset to an extent depending on the amount of carboxylic acid component. The optimum amount of catalyst for a particular combination is determined empirically.

The variation involved can be seen from the amount of boron trifluoride required when reacting a fatty ester with 30% dicyclopentadiene. Using 2% maleic anhydride and 0.132% boron trifluoride was found to be satisfactory in effecting copolymerization of dicyclopentadiene with menhaden oil at 290° F. When a glycerol ester of refined tall oil was used under the same conditions and quantities, 0.20% boron trifluoride was found to be satisfactory. Again, using linseed oil only 0.10% boron trifluoride was required.

It is often desirable upon completion of the copolymerization reaction to deactivate the catalyst. This can be accomplished relatively easily since it is only necessary to remove or neutralize either the boron trifluoride or the carboxylic acid component. Generally it is preferred to remove the boron trifluoride. There are several ways of accomplishing this, among them being neutralizing with a basic material, vacuum distilling or sparging with steam.

The method of neutralizing with a basic material is the most desirable. Either an organic or inorganic base may be utilized. However, strong inorganic bases are not desirable since any excess will saponify fatty acids and fatty esters. For best results fatty tertiary amines are preferred and have been found to perform most satisfactorily. Such amines as dimethyl lauryl amine and dimethyl coco amine have been found to perform exceptionally well and are preferred. The amount of neutralizing agent required is dependent upon the type used. When a long chain fatty tertiary amine such as dimethyl lauryl amine is used to neutralize the boron trifluoride, approximately two to three times the amount by weight of boron trifluoride used in copolymerization is required to complete neutralization. Excessive amounts have not been found to be harmful to the film properties and curing characteristics.

Once the catalyst has been deactivated the polymerized oil can be subjected to higher temperatures to further polymerize or esterify the oil.

The ethylenically unsaturated compounds which will react with dicyclopentadiene under the conditions of this invention, include products containing unsaturated fatty material. The term fatty means an aliphatic hydrocarbon of 8 to 26 carbon atoms and like olefinic compounds. The fatty chains useful in this invention contain at least 1 double bond in a chain length of 8 to 26 carbon atoms. The chains may be a part of either a monomeric or polymeric compound such as fatty acids, fatty esters or fatty modified resins. The more common useful fatty materials are derived from such source as animal, vegetable and marine oils including linseed, soya, safflower, corn, tall, tung, oiticica, rapeseed, tuna, sardine, menhaden, sperm, anchovy, and the like.

Olefins can also be copolymerized by this process. The term "olefin" is meant to include ethylenically mono- and polyunsaturated hydrocarbons which are either monomeric or partially polymerized and are generally derived from petroleum feed stock. The preferred olefinic hydrocarbons are those which have boiling points above 200° F. and melting points not greater than 130° F. The reaction of dicyclopentadiene with an olefin of the type described produces a polymeric compound which is useful as an extender for drying oils.

The dicyclopentadiene which can be utilized in the reaction of this invention includes dicyclopentadiene, methyl dicyclopentadiene, and cyclopentadiene. The purity of the dicyclopentadiene is not critical. It is desirable, however, to use a product which contains a major proportion of the pentadienes described.

A unique characteristic of this invention is the copolymerization of dicyclopentadiene rather than the cyclopentadiene. High pressure and reflux reactions copolymerize through cyclopentadiene which is formed at the boiling temperature of dicyclopentadiene. The result is that copolymers of somewhat different characteristics are obtained by the present invention than those obtained by other means. The most noticeable difference is the lower viscosities that can be obtained.

The amount of dicyclopentadiene used based on the total charge by weight can vary from about 5% up to about 60%, the remaining portion being an unsaturated fatty compound or olefin and the catalyst composition.

The copolymerization is carried out by charging an ethylenically unsaturated compound, dicyclopentadiene and the catalyst comprising boron trifluoride and a carboxylic acid component to a reaction vessel in an amount so that the heated charge preferably fills at least 75% of the vessel. The vessel is heated without pressure requirements, usually near atmospheric pressure, with agitation to a temperature from about 130° F. to about 340° F. The preferred temperature range is about 250° F. to about 300° F. If desired, an inert gas can be used to reduce oxidation. The reaction temperature is held until the copolymerization has been completed. This is determined for a particular charge by determining the non-volatile content. When the non-volatile content indicates complete copolymerization, note is made of the viscosity so that for subsequent runs the viscosity can be used as an indication of the copolymerization progress.

The copolymerization will have been completed within a period of about two to four hours. When completed, the catalyst is neutralized with a basic compound. A higher polymer can then be formed by further heating at temperatures of 400° F. to 520° F. Whether a higher polymer is desired is dependent upon the expected use of the product.

The copolymerization product can be varied in the degree of polymerization from about 2 stokes up to the gelation stage. The viscosity is dependent primarily on the type and amount of carboxylic acid used rather than the amount of dicyclopentadiene. Thus, using 2% maleic anhydride in the catalyst composition and 30% dicyclopentadiene, the remainder being a fatty glycerol ester, a viscosity as low as 2 stokes can be obtained, or as high as several hundred. However, if high viscosities are desired, 5% maleic anhydride is used instead of 2%, to readily yield viscosities up to and including the gelation stage.

When the oil is intended for use as a coating vehicle, the carboxylic acid component of the catalyst is preferably esterified with a polyol such as glycerin, pentaerythritol, sorbitol and the like to obtain a low acid value. Coating vehicles are more resistant to alkali when they have an acid value of less than about 10. This esterification can readily be accomplished by adding a polyol upon completion of the copolymerization step and preferably after neutralizing the boron trifluoride with a basic material. The esterification is carried out in the normal procedure at temperatures of 400° F. to 520° F.

The following examples are included to illustrate certain preferred embodiments of the present invention. All parts and percentages are by weight.

*Example I*

This example illustrates the copolymerization of menhaden oil with dicyclopentadiene. The reaction was effected by charging 838 parts of menhaden oil having an iodine value of 175, 24 parts of maleic anhydride, and 370 parts of dicyclopentadiene which was 90% reactive, to a reaction vessel of sufficient size so that the vessel was 75% filled. The reaction vessel was equipped with a stirrer and a thermometer. While stirring the reaction mixture 1.64 parts of boron trifluoride were bubbled into the reaction mixture. Heating was commenced, allowing the reaction mixture to reach 280° F. where it was held for 3 hours. During this period the viscosity increased from 0.5 stoke to 2.5 stokes. The viscosity increase indicated that all of the dicyclopentadiene had copolymerized. The boron trifluoride portion of the catalyst was then neutralized by adding 4.3 parts of dimethyl lauryl amine.

Since a higher viscosity oil was desired, the reaction temperature was then increased to 460° F. Evidence of complete copolymerization was noted in that there was very little volatile matter leaving the vessel at this temperature. After 30 minutes at 460° F., 30 parts of refined glycerin were added to esterify the maleic anhydride. A vacuum of 28" of mercury was then drawn and heating was continued in the range of 460 to 470° F. The product reached the desired viscosity of 15 stokes at 100% non-volatile in 2 hours at which time the heating was terminated. After cooling the resulting copolymer had an acid value of 5.7 and a viscosity of 17 stokes. The yield based on the charge was 97%.

*Example II*

A high viscosity fast drying coating vehicle was prepared by charging 960 parts of dicyclopentadiene which was 90% reactive, 1320 parts of refined soybean oil and 120 parts of maleic anhydride to a reaction flask equipped with a thermometer and stirring mechanism. The charge filled the vessel to 75% capacity. Agitation was commenced. While agitating, 8 parts of boron trifluoride etherate (48% boron trifluoride) were added to the reaction vessel. Heating was commenced at atmospheric pressure and the temperature was increased over a period of 45 minutes to 260° F. This temperature was held for three hours. The viscosity increased from 0.5 stoke to 9.0 stokes measured at 90% non-volatile in mineral spirits during this period. Previous experience had established that this viscosity indicated a complete copolymerization.

The boron trifluoride was then neutralized by adding 15 parts of 75% reactive dimethyl coco amine. The temperature was then increased to 485° F. 60 parts of glycerin were added and the product was bodied under a vacuum of 28" of mercury until a viscosity of 25 stokes at 70% non-volatile in mineral spirits was obtained. The heating time at 485° F. was three hours. Heating was terminated and the product was diluted with mineral spirits.

The final product had an acid number of 6.3, a viscosity of 30 stokes, and a non-volatile content of 70% in mineral spirits. The yield based on the charge was 95%.

*Example III*

A product similar to that of Example II was prepared using an ester of refined tall oil. This product was prepared by charging 240 parts of dicyclopentadiene which was 90% reactive, 330 parts of refined tall oil esterified with pentaerythritol to an acid number of 5, and 30 parts of maleic anhydride to a reaction vessel similar to that of Example II. After commencing agitation 2 parts of boron trifluoride etherate (48% boron trifluoride) were added to the reaction mixture. The reaction was carried out in the same manner as Example II with the exception that 3 parts of N,N-dimethylaniline were used to neutralize the boron trifluoride in place of the dimethyl coco amine of Example II. In addition, 20 parts of refined glycerin were added to reduce the acid value of the final product. The processing time was the same as that of Example II. The final product had an acid number of 5.2, a viscosity of 32 stokes, and a non-volatile content of 70% in mineral spirits.

*Example IV*

A low-viscosity dicyclopentadiene copolymer was made by reacting 60 parts of dicyclopentadiene which was 90% reactive, 428 parts of refined tall oil esterified with pentaerythritol to an acid value of 10, 12 parts of maleic anhydride and 1.5 parts of boron trifluoride etherate (48% boron trifluoride). This reaction mixture was charged to a reaction vessel of such size so that the charge filled 75% of the vessel. Heating was commenced under agitation and at atmospheric pressure. The temperature was increased to 180° F. and held for four hours. After four hours the non-volatile content of the reaction mixture indicated that all of the dicyclopentadiene had copolymerized. The boron trifluoride was then neutralized by adding 2.3 parts of dimethyl lauryl amine. The temperature was increased to 500° F. at which time a vacuum of 28" of mercury was applied. After one hour under vacuum the heating was terminated and the reaction vessel cooled. The resulting product had a viscosity of 2.0 stokes at 100% non-volatile. The acid value was 14.5. The yield based on the charge was 97%.

*Example V*

Another low viscosity dicyclopentadiene copolymer oil was made by charging 12 parts of succinic anhydride, 468 parts of menhaden oil having an iodine value of 170, 120 parts of dicyclopentadiene which was 90% reactive, and 1.8 parts of boron trifluoride etherate (48% boron trifluoride) to a reaction flask equipped with a thermometer and stirring mechanism. Agitation was initiated and the temperature increased to 300° F. at atmospheric pressure. When the non-volatile content of the reaction mixture indicated that the copolymerization had been effected, the boron trifluoride was neutralized by adding 2.4 parts of 75% dimethyl coco amine. The copolymerization was effected within a 3 hour period. The viscosity increased from a Gardner A to a Gardner D during this period. After the addition of the dimethyl coco amine the temperature was increased to 485° F. where it was held for one-half hour after which 15 parts of refined glycerin were added. Heating was continued at 485° F. for an additional hour. A vacuum of 28" of mercury was then drawn to strip off the low boiling constitutents and the water of esterification. The resulting product had a viscosity of 2.5 stokes at 100% non-volatile and an acid number of 6.8. The yield based on the charge was 95%.

*Example VI*

A dicyclopentadiene copolymer was prepared by reacting an unsaturated olefin with dicyclopentadiene. The reaction was carried out by charging 468 parts of an unsaturated hydrocarbon derived from a petroleum feed stock called CTLA, 120 parts of dicyclopentadiene which was 90% reactive and 12.6 parts of fumaric acid to a reaction vessel. (CTLA is a heat reactive olefinic hydrocarbon having an API gravity of 6–14, a viscosity of 100–250 SUS at 210° F., an iodine value of 240 (min.), a flash point (COC min.) of 210° F., an acid number of 0.1 mg. KOH/gram, and a saponification number of 3.18 mg. KOH/gram.) The vesesl was equipped with a stirring mechanism and thermometer. The vessel was about 75% filled after charging the reactants. Stirring was initiated and 1.8 parts of boron trifluoride etherate (48% boron trifluoride) were added to the reaction mixture. The reaction was carried out following the procedure of Example V. The resulting copolymer oil had a viscosity of 10.2 stokes at 100% non-volatile. The yield was 93%.

*Example VII*

Another dicyclopentadiene copolymer was prepared using a hydrocarbon mixture containing 55% reactive dicyclopentadiene. This product was made by charging 468 parts of linseed oil, 200 parts of a hydrocarbon mixture containing 55% dicyclopentadiene, and the catalyst comprising 12.6 parts of crotonic acid and 1.8 parts of boron trifluoride etherate (48% boron trifluoride) to a reaction flask. The reaction was carried out as in Example V. The resulting copolymer oil had a viscosity of 2.5 stokes at 100% non-volatile, a dicyclopentadiene content of about 19% and an acid value of 7.5. The yield based on the charge was 91%.

*Example VIII*

Another dicyclopentadiene copolymer was prepared using oxalic acid as a portion of the catalyst system. The amounts and procedures were the same as that of Example V substituting oxalic acid for the succinic anhydride used in Example V. The oxalic acid effected a larger increase in viscosity than did succinic anhydride. The resulting copolymer oil had a viscosity of 33 stokes at 100% non-volatile.

*Example IX*

This example illustrates the fact that the copolymerization will not take place without the presence of a carboxylic acid of the type described when boron trifluoride is used in the amount stated herein.

Example II was repeated using the same charge with the exception of the maleic anhydride. The charge was heated to 300° F. and held for 5 hours. The non-volatile content indicated that almost none of the dicyclopentadiene had copolymerized. The heat was then increased to the reflux point of 340° F. to 350° F. After several hours at this temperature a small proportion of the dicyclopentadiene had copolymerized with the oil. It was evident that the reaction would not proceed or be completed at a desirable rate using the low boron trifluoride levels indicated herein without the carboxylic acid material.

*Example X*

Film properties of the product of Example II were evaluated by reducing the vehicle to 50% non-volatile with mineral spirits. Napthenate salts were added to this vehicle so as to obtain 0.025% manganese, 0.5% lead, and 0.025% cobalt in the drying vehicle based on the vehicle solids. A 1.5 mil wet film was drawn on a glass plate. The film set to touch in 2 hours and reached a 100 Gram Zapon dry in 5 hours. The 7-day Sward hardness was 34 and the slip and gloss were exceptionally good.

*Example XI*

The product of Example II was evaluated as a fertilizer encapsulating agent. This vehicle was reduced to 50% non-volatile in mineral spirits and napthenate driers were added so that the vehicle contained 0.025% manganese, 0.5% lead, and 0.025% cobalt based on the non-volatile content. This vehicle was sprayed onto granular fertilizer and cured by passing heated air through the granules. The vehicle dried to a non-lift stage in about 8 minutes. The resulting coated fertilizer exhibited a controlled release of nutrients.

*Example XII*

The product produced in Example I was evaluated as a fast-drying core oil. The vehicle was used at 100% non-volatile and compared to linseed oil. One part by weight of each oil was mixed with 100 parts of Port Crescent Lake sand and 2 parts of water. Hand rammed AFS standard briquettes were made and baked at 425° in an electric oven. The tensile strength of the resulting cores was determined. The following results were obtained:

|  | Pounds per Square Inch | | | |
| --- | --- | --- | --- | --- |
|  | 30 min. | 45 min. | 60 min. | 80 min. |
| Linseed oil | 120 | 170 | 194 | 169 |
| Product of Example I | 262 | 282 | 278 | 249 |

The above results clearly indicate the high tensile properties that can be obtained with the copolymers produced with the process of this invention.

The embodiments of the present invention in which an exclusive property or privilege is claimed are defined as follows:

1. A process comprising providing a reaction mixture of (1) an unsaturated compound selected from the group consisting of unsaturated fatty acids, unsaturated fatty acid esters of polyhydric alcohols, and petroleum-derived olefins, said unsaturated compound having an unsaturated aliphatic chain with 8–26 carbon atoms, (2) dicyclopentadiene, and (3) a catalyst comprising 0.02 to 0.35% boron trifluoride and 1 to 10% of a carboxylic acid component having 2–8 carbon atoms per molecule and selected from the group consisting of dicarboxylic acids and their anhydrides, said percents being based on the total weight of said reaction mixture, and heating said reaction mixture at a temperature of 130–340° F. to effect copolymerization.

2. The process according to claim 1 wherein said unsaturated compound is a fatty acid ester of glycerol and said carboxylic acid component is maleic anhydride.

3. The process according to claim 1 wherein said unsaturated compound is selected from the group consisting of menhaden oil, soybean oil, tall oil esterified with pentaerythritol, and linseed oil, and said carboxylic acid component is selected from the group consisting of maleic anhydride, succinic anhydride, fumaric acid, and oxalic acid.

4. A process for producing a reaction mixture of fatty esters and dicyclopentadiene comprising mixing 40 to 94 parts of fatty acid ester of glycerol (said fatty acid having 8–26 carbon atoms in an unsaturated aliphatic chain thereof) with 5 to 60 parts of dicyclopentadiene and a catalyst comprising 0.02 to 0.35 part of boron trifluoride and 1 to 10 parts of maleic anhydride, heating to a temperature of 130° F. to 340° F. to effect the copolymerization, neutralizing the boron trifluoride with a base, further heating at a temperature of 400° F. to 520° F. with a polyhydric alcohol to esterify the acid value to less than 10.

5. Claim 4 where the neutralizing base is a dimethyl fatty amine.

References Cited by the Examiner

UNITED STATES PATENTS

| 2,361,018 | 10/1944 | Gerhart | 260—23.7 |
| 2,390,530 | 12/1945 | Gerhart et al. | 260—23.7 |
| 2,398,889 | 4/1946 | Gerhart | 260—23.7 |
| 2,601,273 | 6/1952 | Gerhart | 260—23.7 |
| 2,608,550 | 8/1952 | Rowland et al. | 260—78.5 |
| 3,005,800 | 10/1961 | Powers et al. | 260—78.4 |
| 3,188,303 | 6/1965 | Dissen | 260—78.4 |
| 3,193,449 | 7/1965 | Aldrich et al. | 260—27 |

LEON J. BERCOVITZ, *Primary Examiner.*

R. WHITE, *Assistant Examiner.*